US010893534B2

United States Patent
Liu et al.

(10) Patent No.: US 10,893,534 B2
(45) Date of Patent: Jan. 12, 2021

(54) AIR INTERFACE RESOURCE ALLOCATION METHOD AND NETWORK DEVICE

(71) Applicant: Huawei Technologies Co., Ltd., Shenzhen (CN)

(72) Inventors: Qi Liu, Shanghai (CN); Yi Zhang, Shanghai (CN); Wenyuan Yong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/203,866

(22) Filed: Nov. 29, 2018

(65) Prior Publication Data

US 2019/0098648 A1 Mar. 28, 2019

Related U.S. Application Data

(63) Continuation of application No. PCT/CN2016/084155, filed on May 31, 2016.

(51) Int. Cl.
*H04W 72/12* (2009.01)
*H04W 72/10* (2009.01)
(Continued)

(52) U.S. Cl.
CPC ......... *H04W 72/1247* (2013.01); *H04W 4/70* (2018.02); *H04W 72/0406* (2013.01);
(Continued)

(58) Field of Classification Search
CPC ......... H04W 72/1247; H04W 72/0453; H04W 72/0406; H04W 4/70; H04W 72/10; H04W 92/10; H04W 72/1242; H04L 5/0007
See application file for complete search history.

(56) References Cited

U.S. PATENT DOCUMENTS

2006/0215600 A1 9/2006 Chen et al.
2009/0143046 A1 6/2009 Smith
(Continued)

FOREIGN PATENT DOCUMENTS

CN 101175020 A 5/2008
CN 101868000 A 10/2010
(Continued)

OTHER PUBLICATIONS

"Requirement for Next Generation Access," Source: Ericsson, Huawei, ITRI, Nokia Networks, Alcatel-Lucent, NTT DOCOMO, Agenda Item: 5, Document for: Discussion, 3GPP TSG-RAN ad hoc, RPa160063, Barcelona, Spain, Jan. 28-29, 2016, 4 pages.
(Continued)

*Primary Examiner* — Peter P Chau
(74) *Attorney, Agent, or Firm* — Slater Matsil, LLP

(57) ABSTRACT

The method for air interface resource allocation, including allocating a first air interface resource to a first service with a first latency sensitivity, allocating, to a second service with a second latency sensitivity that is greater than the first latency sensitivity, a second air interface resource on subcarriers of all frequency bands within a current transmission time interval (TTI); and preempting, for the second service, the first air interface resource allocated to the first service, wherein the second service has a higher priority for obtaining the first air interface resource than the first service.

20 Claims, 7 Drawing Sheets

(51) Int. Cl.
*H04W 4/70* (2018.01)
*H04W 72/04* (2009.01)
*H04L 5/00* (2006.01)
*H04W 92/10* (2009.01)

(52) U.S. Cl.
CPC ....... *H04W 72/0453* (2013.01); *H04W 72/10* (2013.01); *H04L 5/0007* (2013.01); *H04W 92/10* (2013.01)

(56) References Cited

U.S. PATENT DOCUMENTS

| | | |
|---|---|---|
| 2009/0164638 A1 | 6/2009 | Jang et al. |
| 2014/0146672 A1 | 5/2014 | Arteaga et al. |
| 2015/0110062 A1 | 4/2015 | Nishio et al. |
| 2015/0334729 A1 | 11/2015 | Ji et al. |
| 2016/0113008 A1* | 4/2016 | Damnjanovic ....... H04W 72/14 370/336 |
| 2016/0128095 A1* | 5/2016 | Damnjanovic ... H04W 72/0446 370/336 |
| 2017/0289907 A1* | 10/2017 | Ang .................. H04W 52/0216 |
| 2019/0090239 A1 | 3/2019 | Damnjanovic et al. |

FOREIGN PATENT DOCUMENTS

| | | |
|---|---|---|
| CN | 101998412 A | 3/2011 |
| CN | 104202775 A | 12/2014 |
| CN | 104320854 A | 1/2015 |
| CN | 105517168 A | 4/2016 |
| EP | 3425981 A1 | 1/2019 |
| JP | 2017519421 A | 7/2017 |
| JP | 2017535187 A | 11/2017 |
| WO | 2015179136 A1 | 11/2015 |
| WO | 2016022849 A1 | 2/2016 |
| WO | 2016060809 A1 | 4/2016 |

OTHER PUBLICATIONS

"Functionality of User Plane in NR," Source: CATT, Agenda Item: 9.4.2, Document for: Discussion and Decision, R2-163464, 3GPP TSG RAN WG2 Meeting #94, May 23-27, 2016, 6 pages.

* cited by examiner

AIR INTERFACE RESOURCE ALLOCATION METHOD AND NETWORK DEVICE

CROSS-REFERENCE TO RELATED APPLICATIONS

This application is a continuation of International Application No. PCT/CN2016/084155, filed on May 31, 2016, the disclosure of which is hereby incorporated by reference in its entirety.

TECHNICAL FIELD

This application relates to the field of communications technologies, and in particular, to air interface resource allocation.

BACKGROUND

Enhanced Mobile Broadband (eMBB) and ultra-reliable/low-latency machine type communications (uMTC) are two major service types in a $5^{th}$ Generation mobile communications technology (5G) defined by the International Telecommunication Union (ITU).

An eMBB service is a service that further improves performance such as user experience on a basis of an existing mobile broadband service scenario. The eMBB service expects a higher data rate and a larger mobile bandwidth. Compared with the prior art, the eMBB service greatly improves a user data rate. In addition, the eMBB service further has high spectral efficiency. Therefore, scheduling an eMBB terminal causes a relatively large amount of computation and is time-consuming. Besides, the eMBB service is a non-latency-sensitive service, and has a low requirement for latency. Usually, a latency may exceed lo milliseconds.

A uMTC service requires an ultra low latency. Therefore, scheduling a uMTC terminal consumes a shorter time. Usually, starting uMTC scheduling is later than starting eMBB scheduling. The uMTC service is mainly applied to thing-to-thing communication in the Internet of Things, mainly including wireless control in an industrial production process, for example, telemedicine surgery, distribution automation, and transportation safety. The uMTC service expects a shorter latency, and usually requires a latency of less than 1 millisecond. To meet a latency requirement of the uMTC service for burst data transmission, when the uMTC service has data to be transmitted, a large quantity of air interface resources need to be allocated to the uMTC service, and the uMTC service needs to use the air interface resources in priority, to ensure timely and correct sending of data and control information in the uMTC service.

The uMTC service has a relatively lower probability or frequency of being activated than the eMBB service. Therefore, if a large quantity of air interface resources are reserved for the uMTC service to ensure high reliability of the uMTC service, the reserved air interface resource is in an idle state in most time. This reduces air interface resource efficiency and causes a waste of resources. However, if no air interface resource is reserved for the uMTC service, timely and correct transmission of data and control information in the uMTC service cannot be ensured.

SUMMARY

This application provides an air interface resource allocation method and a network device, to ensure timely and correct transmission of data and control information in a latency-sensitive service.

According to one aspect, this application provides an air interface resource allocation method. The method includes allocating an air interface to a non-latency-sensitive service, and allocating an air interface resource to a latency-sensitive service on subcarriers of all frequency bands within a current transmission time interval (TTI), and preempting, for the latency-sensitive service, the air interface resource already allocated to the non-latency-sensitive service, where the latency-sensitive service has a higher priority of obtaining the air interface resource than the non-latency-sensitive service.

In this embodiment of this application, the air interface resource already allocated to the non-latency-sensitive service is preempted for the latency-sensitive service, thereby ensuring timely and correct transmission of the latency-sensitive service scheduled later. In addition, any quantity of resource elements required by the non-latency-sensitive service can be allocated to the non-latency-sensitive service based on a requirement, thereby avoiding a waste of resources and saving air interface resources.

According to another aspect, an embodiment of this application provides a network device. The network device includes a processor and a transmitter. The processor is configured to allocate an air interface resource to a non-latency-sensitive service, and allocate an air interface resource to a latency-sensitive service on subcarriers of all frequency bands within a current transmission time interval TTI, and preempt, for the latency-sensitive service, the air interface resource already allocated to the non-latency-sensitive service. The latency-sensitive service has a higher priority of obtaining the air interface resource than the non-latency-sensitive service. The transmitter is configured to send, based on the allocated air interface resource, data and/or control information to a terminal corresponding to the latency-sensitive service or a terminal corresponding to the non-latency-sensitive service.

According to another aspect, an embodiment of this application provides an air interface resource allocation apparatus. The apparatus includes a non-latency-sensitive service resource allocation module and a latency-sensitive service resource allocation module. The non-latency-sensitive service resource allocation module is configured to allocate an air interface resource to a non-latency-sensitive service. The latency-sensitive service resource allocation module is configured to allocate an air interface resource to a latency-sensitive service on subcarriers of all frequency bands within a current transmission time interval TTI, and preempt, for the latency-sensitive service, the air interface resource already allocated to the non-latency-sensitive service. The latency-sensitive service has a higher priority of obtaining the air interface resource than the non-latency-sensitive service.

In a design of this application, the network device is a base station or a remote radio unit.

In a design of this application, the air interface resource allocated to the latency-sensitive service includes the air interface resource already allocated to the non-latency-sensitive service.

In a design of this application, the preempting, for the latency-sensitive service, the air interface resource already allocated to the non-latency-sensitive service is specifically preempting, for the latency-sensitive service and in time domain, the air interface resource already allocated to the non-latency-sensitive service.

In a design of this application, the preempting, for the latency-sensitive service and in time domain, the air interface resource already allocated to the non-latency-sensitive service is specifically preempting, for the latency-sensitive service and on a plurality of subcarriers of some frequency bands within the entire TTI, resource elements already allocated to the non-latency-sensitive service.

In a design of this application, the preempting, for the latency-sensitive service and in time domain, the air interface resource already allocated to the non-latency-sensitive service is specifically when the TTI is a fixed value, preempting, for the latency-sensitive service and in time domain, the air interface resource already allocated to the non-latency-sensitive service.

In a design of this application, the preempting, for the latency-sensitive service, the air interface resource already allocated to the non-latency-sensitive service is specifically preempting, for the latency-sensitive service and in frequency domain, the air interface resource already allocated to the non-latency-sensitive service.

In a design of this application, the preempting, for the latency-sensitive service and in frequency domain, the air interface resource already allocated to the non-latency-sensitive service is specifically preempting, for the latency-sensitive service and on subcarriers of all frequency bands within a time of a plurality of orthogonal frequency division multiplexing OFDM symbols of a part of the TTI, resource elements already allocated to the non-latency-sensitive service.

In a design of this application, the preempting, for the latency-sensitive service and in frequency domain, the air interface resource already allocated to the non-latency-sensitive service is specifically when the TTI is a non-fixed value, preempting, for the latency-sensitive service and in frequency domain, the air interface resource already allocated to the non-latency-sensitive service.

In a design of this application, before the allocating an air interface resource to a non-latency-sensitive service, the method includes reserving an air interface resource for the latency-sensitive service on the subcarriers of all the frequency bands within the TTI, the allocating an air interface resource to a non-latency-sensitive service is specifically allowing a part or all of the reserved air interface resource to be allocated to the non-latency-sensitive service, and the allocating an air interface resource to a latency-sensitive service is specifically preempting, for the latency-sensitive service and in the reserved air interface resource, the air interface resource already allocated to the non-latency-sensitive service.

In a design of this application, the allocating an air interface resource to a latency-sensitive service is specifically allocating idle resource elements in the air interface resource in priority, and if a quantity of the idle resource elements cannot meet a quantity of resource elements required by the latency-sensitive service, preempting, for the latency-sensitive service, the resource elements already allocated to the non-latency-sensitive service.

In a design of this application, after the allocating an air interface resource to a latency-sensitive service, the method includes determining whether resource elements of the subcarriers of all the frequency bands within the current TTI time are first allocated to the non-latency-sensitive service and then allocated to the latency-sensitive service, and if the resource elements of the subcarriers of all the frequency bands within the current TTI time are first allocated to the non-latency-sensitive service and then allocated to the latency-sensitive service, sending information to the latency-sensitive service, and stopping sending information to the non-latency-sensitive service.

In the embodiments of this application, a priority of allocating an air interface resource to the latency-sensitive service is higher than a priority of allocating an air interface resource to the non-latency-sensitive service, and the air interface resource already allocated to the non-latency-sensitive service is preempted for the latency-sensitive service. This resolves an air interface resource allocation problem caused when an air interface resource needs to be first allocated to the non-latency-sensitive service and then an air interface resource is allocated to the latency-sensitive service, and the latency-sensitive service allocated the air interface resource later requires a large enough quantity of air interface resources. The air interface resource allocation method in the embodiments of this application avoids a waste of resources, and ensures timely and correct transmission of data and control information in the latency-sensitive service.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following first briefly describes an air interface resource in this application.

For a multi-carrier wireless communications system, the air interface resource is defined as a time domain resource and a frequency domain resource of an air interface. The air interface is a radio interface between a terminal and a network device such as a base station or remote radio unit (RRU) and a radio interface between terminals in wireless communications. The air interface resource may be divided by time domain and frequency domain. For example, an air interface resource in time domain is represented as an orthogonal frequency division multiplexing (OFDM) symbol, and an air interface resource in frequency domain is represented as a subcarrier. This is not limited in the present invention.

Figure 1:
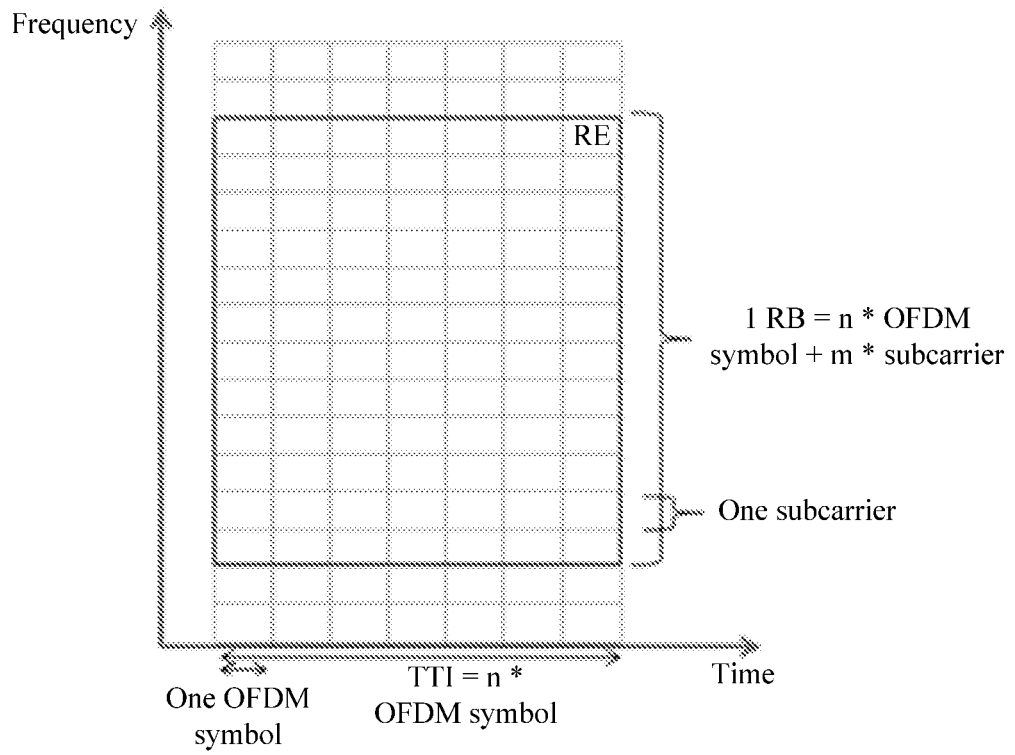
FIG. 1 is a schematic diagram of an air interface resource.

The air interface resource is usually expressed in a resource element (RE), a resource block (RB), an OFDM symbol, a subcarrier, and a transmission time interval (TTI), as shown in FIG. 1.

In FIG. 1, the resource element RE is represented by a small rectangle. One RE represents a subcarrier resource within a time of one OFDM symbol. In other words, each RE is represented by one OFDM symbol in time domain, and is represented by one subcarrier in frequency domain. The transmission time interval TTI is usually a subframe in time domain, and includes a plurality of (for example, n) OFDM symbols that are consecutive in time. Scheduling and resource allocation are performed once every TTI. The resource block RB includes a plurality of (for example, m) subcarriers in one TTI.

The following continues to describe an architecture of a communications system including a network device, a terminal configured with a latency-sensitive service, and a terminal configured with a non-latency-sensitive service in this application.

Figure 2:
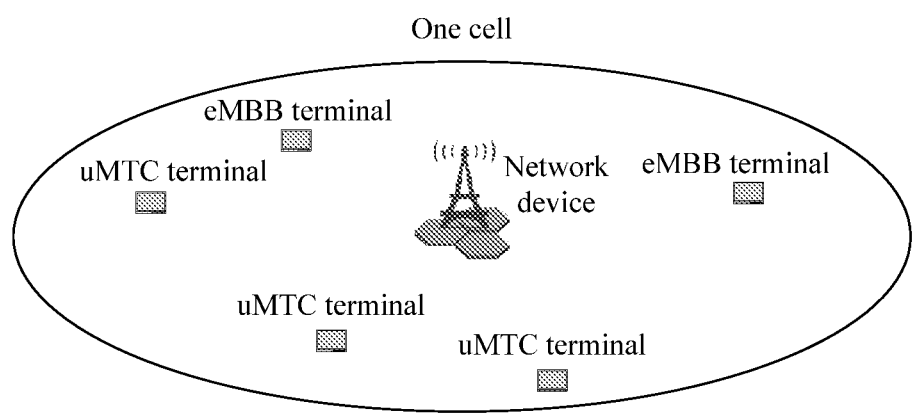
FIG. 2 is a schematic architectural diagram of a communications system in which a network device, an eMBB terminal, and a uMTC terminal are located.

In FIG. 2, in a multi-carrier wireless communications system, a latency-sensitive service terminal, for example, a uMTC terminal, and a non-latency-sensitive service terminal, for example, an eMBB terminal, co-exist in a same cell. A network device such as a base station eNodeB or remote radio unit RRU, starts scheduling and allocates air interface resource to uMTC terminals and eMBB terminals, and sends downlink data and control information to a corresponding terminal device by using an allocated air interface resource. The control information includes an allocation status of an air interface resource that is required for sending data by the corresponding terminal device and that is allocated to the corresponding terminal device by the network device, for example, a base station. In other words, the control information includes air interface resource allocation of a corresponding terminal.

Air interface resource allocation is also radio resource allocation. Air interface resource allocation in the embodiments of this application is allocation of a plurality of resource elements RE to a network device and different service terminals such as an eMBB terminal and a uMTC terminal in a same area (for example, a same cell), so that data and control information are transmitted based on the allocated resource elements RE, and the network device performs scheduling and air interface resource allocation for each terminal once every TTI.

A terminal device such as an eMBB terminal or a uMTC terminal receives the downlink data and the control information from the network device such as a base station. The terminal device obtains, based on the received control information, an air interface resource that is required for sending uplink data by the terminal device and that is allocated by the network device, that is, sends uplink data based on an air interface resource allocated by the network device.

A network device in the embodiments of this application includes a base station, an RRU, and the like. A terminal device includes a latency-sensitive service terminal, for example, a uMTC terminal, and a non-latency-sensitive service terminal, for example, an eMBB terminal. In the embodiments of this application, the latency-sensitive service terminal is not limited to a uMTC terminal, and the non-latency-sensitive service terminal is not limited to an eMBB terminal. For example, the non-latency-sensitive service terminal may alternatively be an mMTC (Massive machine type communications, massive machine type communications) terminal. In the following, an example in which the latency-sensitive service terminal is a uMTC terminal, the non-latency-sensitive service terminal is an eMBB terminal, and the network device is a base station, is used to describe how the network device allocates an air interface resource to the non-latency-sensitive service terminal and the latency-sensitive service terminal.

Figure 3:
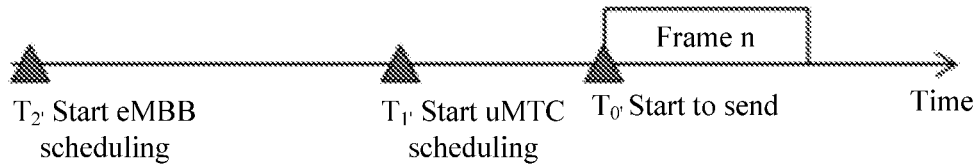
FIG. 3 is a schematic diagram of time domain in which a network device starts eMBB terminal scheduling and uMTC terminal scheduling and starts sending data.
Figure 4:
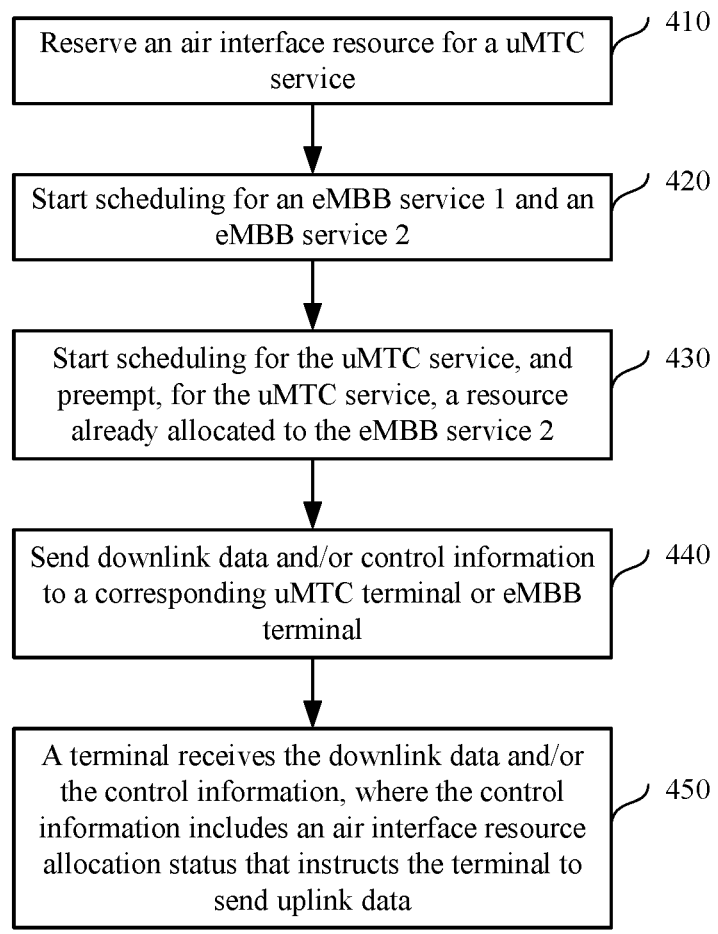
FIG. 4 is a flowchart of an air interface resource allocation method according to an embodiment of this application.

As shown in FIG. 3, a time of starting eMBB terminal scheduling by a base station is earlier than that of starting uMTC terminal scheduling. That is, T2 is earlier than T1, and T1 is earlier than T0. At the time T2, the base station starts eMBB terminal scheduling and allocates an air interface resource to an eMBB terminal. At the time T1, the base station starts uMTC terminal scheduling and allocates an air interface resource to a uMTC terminal. At the time T0, the base station sends data and control information by using an allocated air interface resource.

Although the base station starts uMTC terminal scheduling at a late time, to ensure timely and correct transmission of information between the base station and the uMTC terminal, the base station needs to allocate sufficient air interface resources for information transmission between the base station and the uMTC terminal, because the uMTC terminal is a latency-sensitive service terminal. However, for information transmission between the base station and the eMBB terminal, an air interface resource needs to be used as efficiently as possible, so as to improve spectral efficiency and a throughput of a wireless communications system. Merely reserving an air interface resource for a uMTC service but not allowing the reserved air interface resource to be used by an eMBB service causes a waste of excessive air interface resources. This is because the uMTC terminal has a relatively low probability of being activated. If an air interface resource is reserved for the uMTC service but the reserved air interface resource cannot be used by the eMBB service, the reserved air interface resource is in an idle state in most time, resulting in an excessively low air interface resource utilization and a waste of excessive air interface resources.

In this embodiment of this application, an air interface resource is first allocated to the eMBB service and then an air interface resource is allocated to the uMTC service, and a priority of an air interface resource allocated to the uMTC service is higher than a priority of an air interface resource allocated to the eMBB service. In other words, in this embodiment of this application, an air interface resource sufficient for information transmission is first allocated to the eMBB service, and then an air interface resource is allocated to the uMTC service, when air interface resource allocation is performed for the uMTC service, the air interface resource already allocated to the eMBB service may be preempted for the uMTC service, so as to ensure that sufficient air interface resources can be allocated to the uMTC service.

The allocating an air interface resource to the eMBB service means allocating an air interface resource for information transmission between the eMBB terminal and the network device. Similarly, the allocating an air interface resource to the uMTC service means allocating an air interface resource for information transmission between the uMTC terminal and the network device.

With reference to FIG. 4, and FIG. 5 to FIG. 7, the following describes how a base station allocates an air interface resource to a latency-sensitive service and a non-latency-sensitive service.

The base station usually needs to exchange information with and allocate air interface resources for a plurality of uMTC terminals and a plurality of eMBB terminals. In the following, an example in which a network device exchanges information with and allocates air interface resources for one uMTC terminal and two eMBB terminals, namely, an eMBB terminal 1 and an eMBB terminal 2, is used to describe how the network device allocates an air interface resource to the latency-sensitive service and the non-latency-sensitive service.

Step 410: The base station reserves an air interface resource for a latency-sensitive service, for example, a uMTC service, where the reserved air interface resource may also be allocated to a non-latency-sensitive service, for example, an eMBB service, and the base station allocates a non-reserved air interface resource to the non-latency-sensitive service in priority.

In other words, before being allocated to the uMTC service, the reserved air interface resource may be allocated to the eMBB service, and the uMTC service has a higher priority of being allocated the reserved air interface resource than the eMBB service. That is, for the reserved air interface resource, a use priority of the uMTC service is higher than a use priority of the eMBB service. In addition, the base station allocates the non-reserved air interface resource to the non-latency-sensitive service in priority. The base station may allocate the reserved air interface resource to the eMBB service, and once the uMTC service requires a part or all of the reserved air interface resource, the base station allocates a part or all of the reserved air interface resource to the uMTC service.

In an example, the base station preempts, for the uMTC service and in time domain, an air interface resource already allocated to the eMBB service.

Further, the base station preempts, for the uMTC service, resource elements that are of a plurality of subcarriers of some frequency bands within an entire current transmission time interval TTI and that have already been allocated to the eMBB service. For details, refer to FIG. 5.

In another example, the base station preempts, for the uMTC service and in frequency domain, an air interface resource already allocated to the eMBB service.

Further, the base station preempts, for the uMTC service, resource elements that are on all subcarriers of all frequency bands within a time of a plurality of orthogonal frequency division multiplexing OFDM symbols within a partial TTI and that have already been allocated to the eMBB service. For details, refer to FIG. 7.

Figure 5:
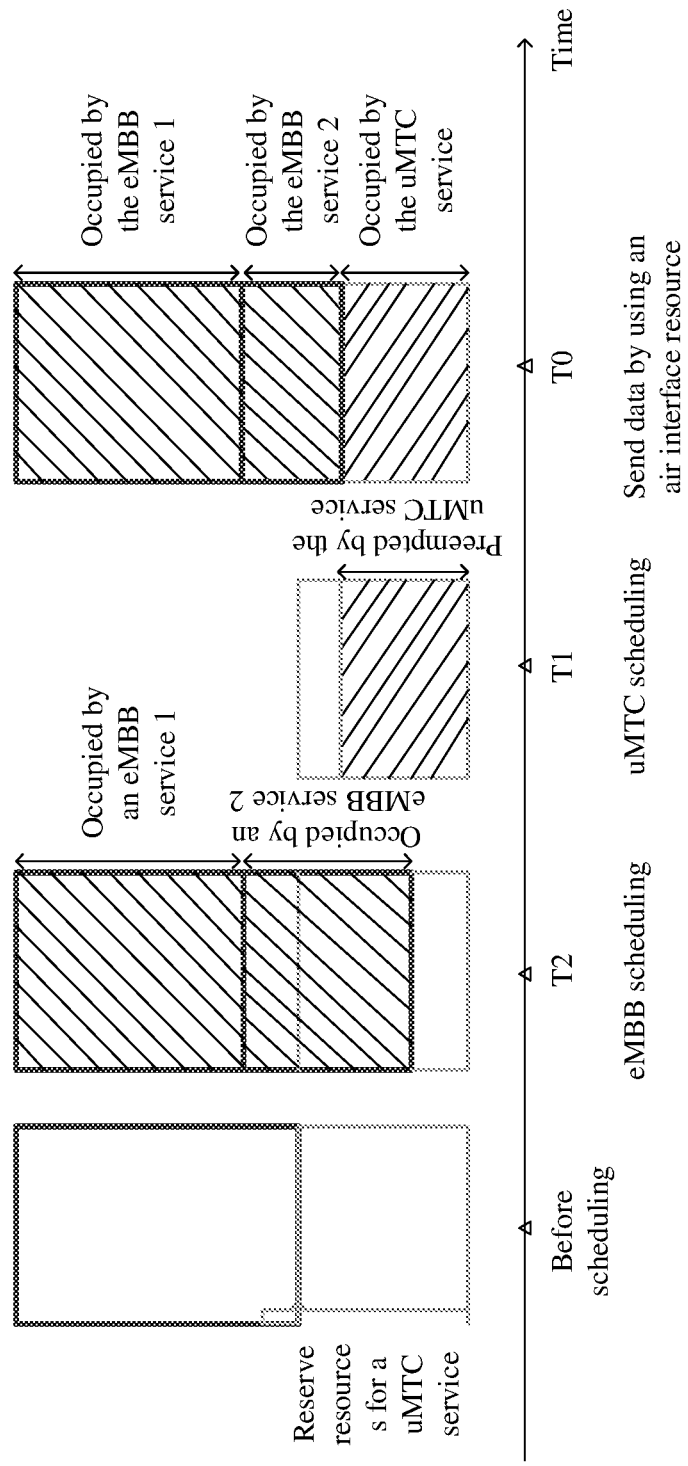
FIG. 5 is a schematic diagram of resource allocation for which an air interface resource is reserved and a resource is preempted in time domain according to an embodiment of this application.

In FIG. 5, a horizontal coordinate represents time domain, and a vertical coordinate represents frequency domain. A block in the figure indicates an air interface resource that includes a plurality of resource blocks RBs, that is, a plurality of resource elements REs. A largest block in FIG. 5 represents the entire TTI in a horizontal direction, that is, a transmission time interval, and represents all subcarriers of all frequency bands in a vertical direction. Another block represents a time of one TTI in the horizontal direction, and represents a plurality of subcarriers of some frequency bands in the vertical direction.

Step 420: In FIG. 5, at a time T2, the base station starts scheduling for an eMBB service 1 and an eMBB service 2, allocates air interface resources required by an eMBB terminal 1 for information exchange between the base station and the eMBB terminal 1, and allocates air interface resources required by the base station and an eMBB terminal 2 for information exchange between the base station and the eMBB terminal 2, where the time T2 is earlier than a time T1, and the time T1 is earlier than a time T0.

In an example, the air interface resource allocated by the base station to the eMBB service includes the air interface resource reserved for the uMTC service.

As shown in FIG. 5, the air interface resources allocated by the base station to the eMBB service 1 and the eMBB service 2 are air interface resources on all subcarriers of all frequency bands within the entire TTI.

Further, the base station allocates the non-reserved air interface resource to the eMBB service 1 and the eMBB service 2 in priority. If a quantity of non-reserved resource elements cannot meet a quantity of resource elements required by the eMBB service 1 and the eMBB service 2, a part or all of the reserved air interface resource are allocated to the eMBB service 2 based on an actual requirement.

Step 430: At the time T1, the base station starts scheduling for the uMTC service, and allocates an air interface resource to the uMTC service, where the air interface resource allocated to the uMTC service may include the air interface resource already allocated to an eMBB terminal.

Further, when allocating an air interface resource to the uMTC service, the base station allocates an idle reserved air interface resource in priority. If a quantity of idle reserved resource elements cannot meet a quantity of resource elements required by the uMTC service, the base station preempts, for the uMTC service and based on a requirement of the uMTC service, reserved resource elements already allocated to the eMBB service 2.

It can be learned that when the quantity of resource elements required by the uMTC service exceeds the quantity of the idle reserved resource elements, the base station preempts, for the uMTC service and in time domain, the resource elements already allocated to the eMBB service 2, and the preempted resource elements are resource elements of the plurality of subcarriers of some frequency bands within the entire TTI time. In other words, resource elements allocated by the base station to the uMTC service include OFDM symbols within the entire TTI time in time domain, and include the plurality of subcarriers of some frequency bands in frequency domain.

It should be noted that the preempting resource elements of the plurality of subcarriers of some frequency bands within the entire TTI for the uMTC service is applicable to a case with a fixed transmission time interval TTI, that is, is applicable to a case in which the TTI is a fixed value.

In conclusion, on all the subcarriers of all the frequency bands within the entire TTI time, the base station may reserve the air interface resource for the uMTC service. When allocating an air interface resource to the eMBB service, the base station is allowed to allocate a part or all of the reserved air interface resource to the eMBB service, for example, the eMBB service 2. When allocating an air interface resource to the uMTC service, the base station preempts, for the uMTC service and in the reserved air interface resource, an air interface resource already allocated to the eMBB service.

In another embodiment of this application, the network device may alternatively reserve no air interface resource for the uMTC service, that is, may not perform the foregoing steps 410 to 430. For details, refer to FIG. 6.

Figure 6:
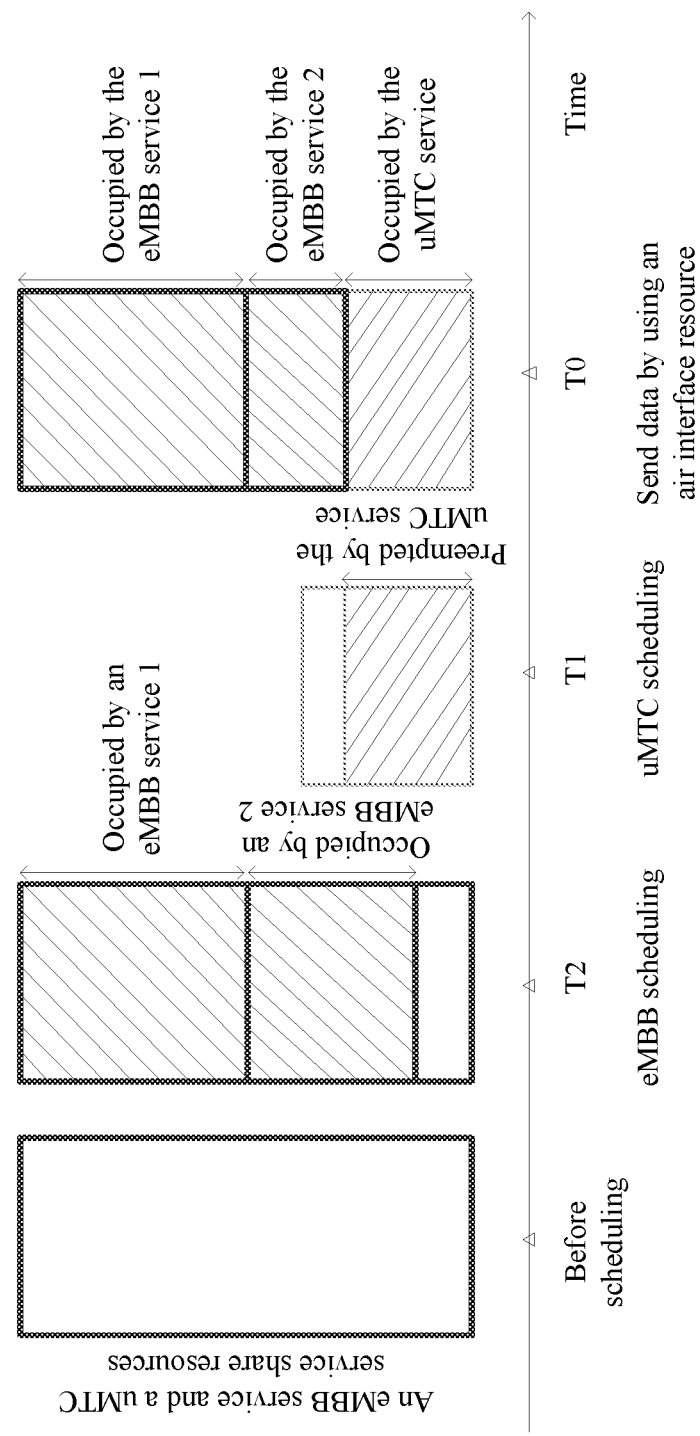
FIG. 6 is a schematic diagram of resource allocation for which no air interface resource is reserved and a resource is preempted in time domain according to an embodiment of this application.

FIG. 6 is a schematic diagram of resource allocation for which no air interface resource is reserved and a resource is preempted in time domain according to an embodiment of this application.

In FIG. 6, a base station reserves no air interface resource for a uMTC service. Both an eMBB service and the uMTC service may obtain an air interface resource on all subcarriers of all frequency bands within the entire TTI, and the base station first allocates an air interface resource to the eMBB service. The uMTC service that is allocated an air interface resource later has a higher priority of obtaining the air interface resource on all the subcarriers of all the frequency bands. In other words, the base station may allocate the air interface resource on all the subcarriers of all the frequency bands within the entire TTI time to the eMBB service, and when the base station allocates an air interface resource to the uMTC service, the base station may preempt, for the uMTC service based on an actual requirement of the uMTC service, the air interface resource already allocated to the eMBB service.

Specifically, at a time T2, the base station allocates, to an eMBB service 1 and an eMBB service 2, air interface resources that are on all the subcarriers of all the frequency bands within the entire TTI time and that are required by the eMBB service 1 and the eMBB service 2. At a time T1, the base station allocates an air interface resource to the uMTC service. If a quantity of currently idle resource elements does not meet a quantity of resource elements required by the uMTC service, the base station preempts, for the uMTC service, resource elements already allocated to the eMBB service 2, to meet the quantity of resource elements required by the uMTC service.

As shown in FIG. 6, the base station preempts resource elements of a plurality of subcarriers of some frequency bands within a current entire TTI time for the uMTC service in time domain. It can be learned from FIG. 6 that the base station preempts a resource element in time domain in priority, and the base station has preempted all resources within the entire TTI time in time domain, but has preempted only resources of some frequency bands in frequency domain.

Figure 7:
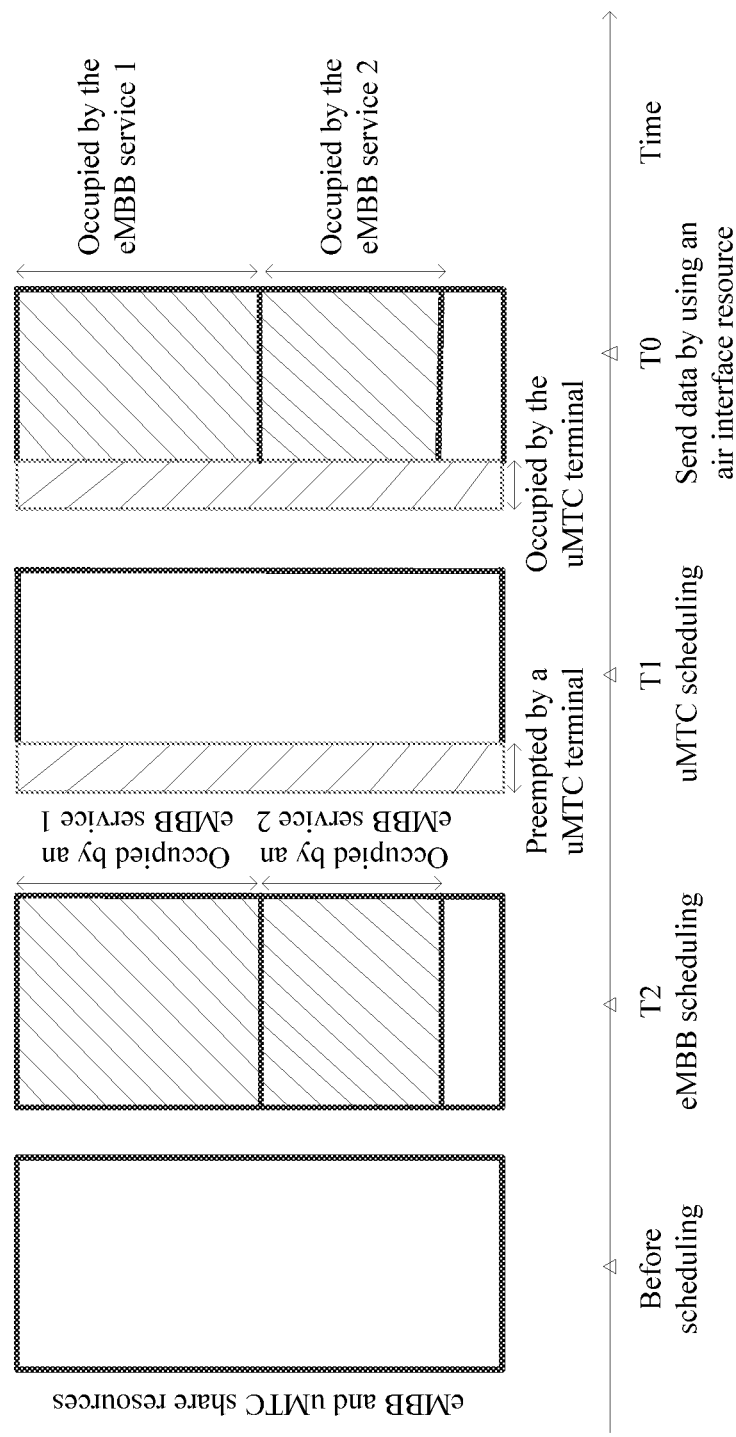
FIG. 7 is a schematic diagram of resource allocation for which no air interface resource is reserved and a resource is preempted in frequency domain according to an embodiment of this application.

In addition, the base station may also preempt a resource in frequency domain in priority. In other words, the base station preempts all preemptable subcarriers of all frequency bands in frequency domain, and may preempt a plurality of OFDM symbols within a part of the TTI in time domain, as shown in FIG. 7. The preemptable subcarrier is a configured subcarrier resource that is allowed to be preempted by the base station for the uMTC service.

FIG. 7 uses reserving no resource element as an example and shows how a base station preempts an air interface resource for a uMTC service in frequency domain in priority.

As shown in FIG. 7, when a quantity of resource elements required by the uMTC service exceeds a quantity of idle resource elements, the base station preempts, for the uMTC service, an air interface resource already allocated to an eMBB service 2. The preempted air interface resource is resource elements on all subcarriers of all frequency bands within a time of a plurality of OFDM symbols of a partial TTI. In other words, the air interface resource allocated by the base station to the uMTC service includes the plurality of OFDM symbols within the partial TTI time in time domain, and includes a plurality of subcarriers of entire frequency bands in frequency domain. This solution is mostly applicable to a case with no fixed transmission time interval TTI, that is, is mostly applicable to a case in which the TTI is a variable.

In addition, for details about a case in which the base station preempts the air interface resource in frequency domain for the uMTC service and may reserve no air interface resource for the uMTC service, refer to FIG. 6 and a related content description, and details are not described herein again.

Step 440: At the time T0, the base station performs, based on the air interface resources allocated to the uMTC service and the eMBB service, processing including packet assembly, encoding, modulation, and the like on data and/or control information that need/needs to be sent to a terminal, and sends processed data and/or control information to a corresponding terminal.

Further, the foregoing step 440 further includes determining whether resource elements on all the subcarriers of all the frequency bands within the current TTI time are first allocated to the eMBB service and then allocated to the uMTC service, and if the resource elements on all the subcarriers of all the frequency bands within the current TTI time are first allocated to the eMBB service and then allocated to the uMTC service, sending data and/or control information to a corresponding uMTC terminal, and stopping sending any information to the eMBB terminal.

Step 450: Terminal devices, including the uMTC terminal and the eMBB terminal, receive downlink data and/or the control information from the base station, where the control information includes an air interface resource allocation status that instructs the terminal to send uplink data, and send corresponding uplink data according to the air interface resource allocation status in the control information.

In conclusion, in this embodiment of this application, a manner of preempting the air interface resource for the latency-sensitive service allows the latency-sensitive service to obtain sufficient air interface resources, so as to ensure correct and timely transmission of the latency-sensitive service. In addition, the air interface resource is first allocated to the non-latency-sensitive service, and any air interface resource, that is, the air interface resource on all the subcarriers of all the frequency bands within the current TTI time, can be allocated to the non-latency-sensitive service, thereby avoiding a waste of air interface resources and saving air interface resources.

Figure 8:
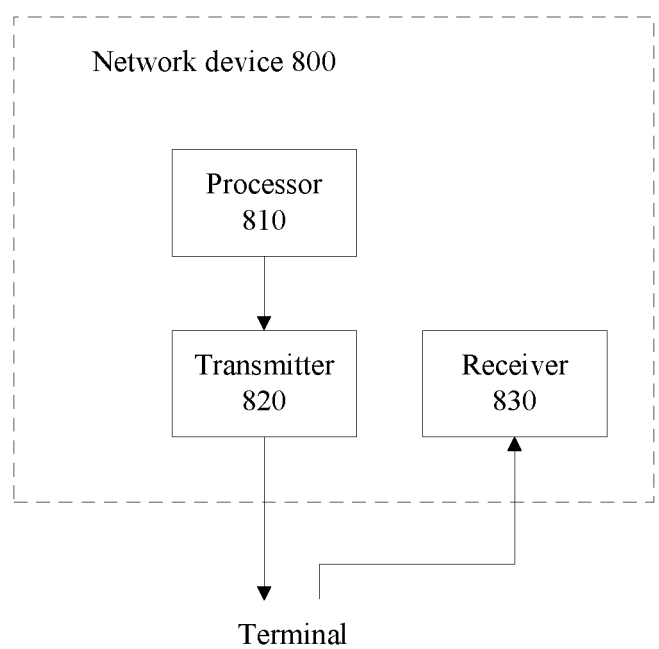
FIG. 8 is a schematic diagram of a network device according to an embodiment of this application.

FIG. 8 is a schematic diagram of a network device according to an embodiment of this application. The network device is, for example, a base station eNodeB or an RRU.

In FIG. 8, the network device 800 includes a processor 810, a transmitter 820, and a receiver 830.

The processor 810 is configured to start scheduling for a non-latency-sensitive service, and allocate an air interface resource to the non-latency-sensitive service on subcarriers of all frequency bands within a current transmission time interval TTI, then start scheduling for a latency-sensitive service, allocate an air interface resource to the latency-sensitive service on the subcarriers of all the frequency bands within the TTI, and preempt, for the latency-sensitive service, the air interface resource already allocated to the non-latency-sensitive service, where the latency-sensitive service has a higher priority of obtaining the air interface resource than the non-latency-sensitive service.

The transmitter 820 is configured to send, based on the allocated air interface resource, data and/or control information to a terminal configured with a latency-sensitive service or a terminal configured with a non-latency-sensitive service.

In an example, the air interface resource allocated by the processor 810 to the latency-sensitive service includes the air interface resource already allocated to the non-latency-sensitive service.

In an example, the processor 810 is further configured to preempt, for the latency-sensitive service and in time domain, the air interface resource already allocated to the non-latency-sensitive service.

Further, the processor 810 is further configured to preempt, for the latency-sensitive service, resource elements that are of a plurality of subcarriers of some frequency bands within the entire TTI and that have already been allocated to the non-latency-sensitive service.

Further, the processor 810 is further configured to when the TTI is a fixed value, preempt, for the latency-sensitive service and in time domain, the air interface resource already allocated to the non-latency-sensitive service.

In another example, the processor 810 is further configured to preempt, for the latency-sensitive service and in frequency domain, the air interface resource already allocated to the non-latency-sensitive service.

Further, the processor 810 is further configured to preempt, for the latency-sensitive service, resource elements that are on subcarriers of all frequency bands within a time of a plurality of orthogonal frequency division multiplexing OFDM symbols of a partial TTI and that have already been allocated to the non-latency-sensitive service.

Further, the processor 810 is further configured to when the TTI is a non-fixed value, preempt, for the latency-sensitive service and in frequency domain, the air interface resource already allocated to the non-latency-sensitive service.

In an example, the processor 810 is further configured to reserve an air interface resource for the latency-sensitive service on the subcarriers of all the frequency bands within the TTI, and when allocating the air interface resource to the non-latency-sensitive service, allow a part or all of the reserved air interface resource to be allocated to the non-latency-sensitive service, and when allocating the air interface resource to the latency-sensitive service, preempt, for the latency-sensitive service and in the reserved air interface resource, the air interface resource already allocated to the non-latency-sensitive service.

In an example, the processor 810 is further configured to when allocating the air interface resource to the latency-sensitive service, allocate idle resource elements in the air interface resource in priority, and if a quantity of the idle resource elements cannot meet a quantity of resource elements required by the latency-sensitive service, preempt, for the latency-sensitive service, the resource elements already allocated to the non-latency-sensitive service.

In an example, the processor 810 is further configured to determine whether resource elements on all the subcarriers of all the frequency bands within the current TTI time are first allocated to the non-latency-sensitive service and then allocated to the latency-sensitive service, and if the resource elements on all the subcarriers of all the frequency bands within the current TTI time are first allocated to the non-latency-sensitive service and then allocated to the latency-sensitive service, send a notification to the transmitter 820. The transmitter 820 is further configured to based on the notification, send data and/or control information to the latency-sensitive service, and stop sending information to the non-latency-sensitive service.

The receiver 830 is configured to receive data from the terminal configured with the latency-sensitive service or the terminal configured with the non-latency-sensitive service, where the data is sent based on the air interface resources allocated by the processor 810.

Figure 9:
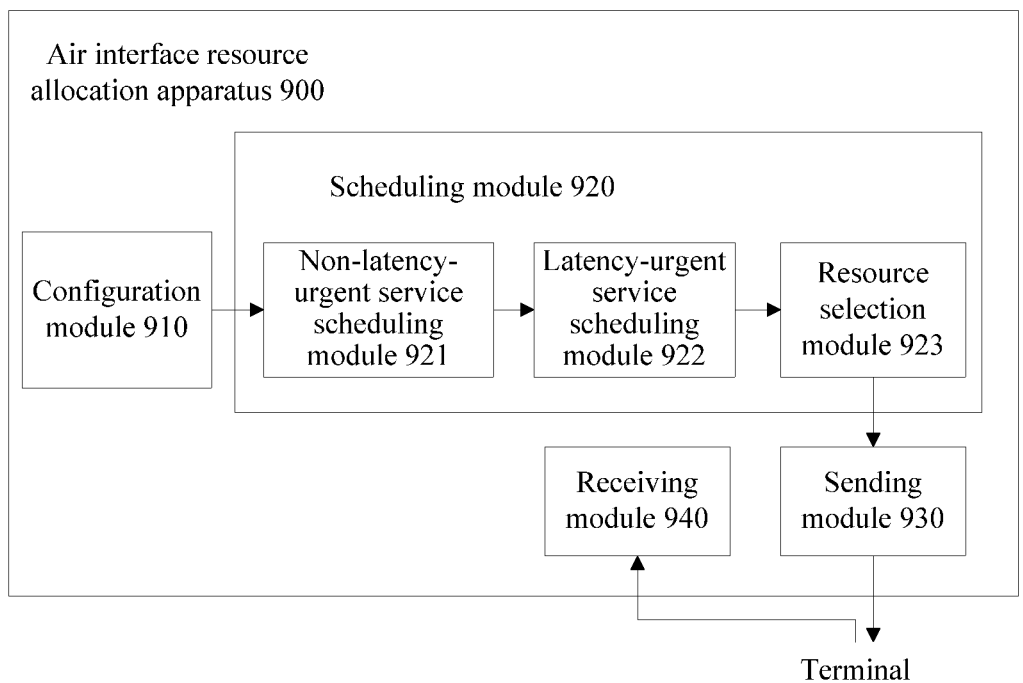
FIG. 9 is a schematic diagram of an air interface resource allocation apparatus according to an embodiment of this application.

FIG. 9 is a schematic diagram of an air interface resource allocation apparatus according to an embodiment of this application. The air interface resource allocation apparatus 900 includes a configuration module 910, a scheduling module 920, a sending module 930, and a receiving module 940. The scheduling module 920 includes a non-latency-sensitive service scheduling module 921, a latency-sensitive service scheduling module 922, and a resource selection module 923.

The configuration module 910 is configured to reserve an air interface resource for a latency-sensitive service, for example, a uMTC service, on subcarriers of all frequency bands within an entire TTI, and allow a part or all of the reserved air interface resource to be allocated to a non-latency-sensitive service, for example, an eMBB service, where the latency-sensitive service, for example, the uMTC service, has a higher priority of obtaining the reserved air interface resource than the non-latency-sensitive service, for example, the eMBB service.

The scheduling module 920 is configured to start scheduling for each non-latency-sensitive service and each latency-sensitive service, and allocate an air interface resource.

The non-latency-sensitive service scheduling module 921 in the scheduling module 920 is configured to start scheduling for the non-latency-sensitive service, and allocate, to the non-latency-sensitive service, an air interface resource that is on all subcarriers of all frequency bands within a current transmission time interval TTI and that is required by the non-latency-sensitive service.

The latency-sensitive service scheduling module 922 in the scheduling module 920 is configured to allocate a resource element required by a latency-sensitive service to the latency-sensitive service, and preempt, for the latency-sensitive service, the air interface resource already allocated to the non-latency-sensitive service, where the latency-sensitive service has a higher priority of obtaining the air interface resource than the non-latency-sensitive service. In other words, an air interface resource allocated by the scheduling module 920 to the latency-sensitive service includes the air interface resource already allocated to the non-latency-sensitive service.

In addition, a time of scheduling the non-latency-sensitive service by the scheduling module 920 is earlier than that of scheduling the latency-sensitive service. That is, the scheduling module 920 first schedules the non-latency-sensitive service and then schedules the latency-sensitive service.

In an example, the latency-sensitive service scheduling module 922 is further configured to preempt, in time domain, the air interface resource already allocated to the non-latency-sensitive service.

Further, the latency-sensitive service scheduling module 922 preempts, for the latency-sensitive service, resource elements that are of a plurality of subcarriers of some frequency bands within the entire TTI time and that have already been allocated to the non-latency-sensitive service. For details, refer to FIG. 5, FIG. 6, and a related content description. Further, that the latency-sensitive service scheduling module 922 allocates the resource elements of the plurality of subcarriers of some frequency bands within the current transmission time interval TTI to the latency-sensitive service is applicable to a case in which the transmission time interval TTI is a fixed value.

In another example, the latency-sensitive service scheduling module 922 is further configured to preempt, for the latency-sensitive service and in frequency domain, the air interface resource already allocated to the non-latency-sensitive service.

Further, the latency-sensitive service scheduling module 922 is further configured to preempt, for the latency-sensitive service, resource elements that are of subcarriers of all frequency bands within a time of a plurality of orthogonal frequency division multiplexing OFDM symbols of a partial TTI and that have already been allocated to the non-latency-sensitive service. For details, refer to FIG. 7 and a related content description.

Further, that the latency-sensitive service scheduling module 922 is further configured to allocate the resource elements of the subcarriers of all the frequency bands within the time of the plurality of OFDM symbols of the partial TTI time to the latency-sensitive service is applicable to a case in which the transmission time interval TTI is a non-fixed value.

In an example, the latency-sensitive service scheduling module 922 is further configured to when allocating the air interface resource to the latency-sensitive service, allocate idle resource elements in priority, and if a quantity of the idle resource elements cannot meet a quantity of resource elements required by the latency-sensitive service, preempt, for the latency-sensitive service, the resource elements already allocated to the non-latency-sensitive service.

The resource selection module 923 is configured to determine whether resource elements on all the subcarriers of all the frequency bands within the current TTI time are first allocated to the non-latency-sensitive service and then allocated to the latency-sensitive service, and if the resource elements on all the subcarriers of all the frequency bands within the current TTI time are first allocated to the non-latency-sensitive service and then allocated to the latency-sensitive service, send a notification to the sending module 930.

The sending module 930 is configured to when a message received from the resource selection module 923 is that current resource elements are first allocated to the non-latency-sensitive service and then allocated to the latency-sensitive service, send data and/or control information to a corresponding terminal configured with a latency-sensitive service, and stop sending any information to a terminal configured with a non-latency-sensitive service.

The receiving module 940 is configured to receive information from a terminal configured with a latency-sensitive service and the terminal configured with the non-latency-sensitive service. The information is sent by a corresponding terminal based on the air interface resource allocated by the scheduling module 920.

The foregoing describes a data transmission method in the embodiments of this application. A person skilled in the art may be aware that the method embodiments and each step process can be implemented by hardware. A person skilled in the art can construct corresponding modules and variants based on the foregoing method embodiments, these modules and variants shall fall within the protection scope of this application, and details are not described herein.

A person skilled in the art may be further aware that, the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of this application are further described in detail. It should be understood that the foregoing descriptions are merely specific implementations of this application, but are not intended to limit the protection scope of this application. Any modification, equivalent replacement, or improvement made without departing from the principle of this application should fall within the protection scope of this application.

What is claimed is:

1. An air interface resource allocation method, comprising:
    allocating a first air interface resource to a first service with a first latency sensitivity;
    allocating, to a second service with a second latency sensitivity that is greater than the first latency sensitivity, a second air interface resource on subcarriers of all frequency bands within a current transmission time interval (TTI); and
    preempting, for the second service and in response to a quantity of idle resource elements of the second air interface resource allocated to the second service not meeting a quantity of resource elements required by the second service, resource elements of the first air interface resource allocated to the first service, wherein the second service has a higher priority for obtaining the first air interface resource than the first service.

2. The method according to claim 1, wherein the preempting, for the second service, the resource elements of the first air interface resource comprises:
    preempting, for the second service, in a time domain, the resource elements of the first air interface resource already allocated to the first service.

3. The method according to claim 2, wherein the preempting, for the second service, in the time domain, the resource elements of the first air interface resource comprises:
    preempting, for the second service, on a plurality of subcarriers of one or more frequency bands within the entire TTI, the resource elements already allocated to the first service.

4. The method according to claim 2, wherein the preempting, for the second service, in the time domain, the resource elements of the first air interface resource comprises:
    preempting, for the second service, in the time domain, and in response to the TTI being a fixed value, the resource elements of the first air interface resource already allocated to the first service.

5. The method according to claim 1, wherein the preempting, for the second service, the resource elements of the first air interface resource comprises:
preempting, for the second service, in a frequency domain, the resource elements of the first air interface resource already allocated to the first service.

6. The method according to claim 5, wherein the preempting, for the second service, in the frequency domain, the resource elements of the first air interface resource comprises:
preempting, for the second service, on subcarriers of all frequency bands within a time of a plurality of orthogonal frequency division multiplexing (OFDM) symbols of at least a part of the TTI, first resource elements already allocated to the first service.

7. The method according to claim 5, wherein the preempting, for the second service, in frequency domain, the resource elements of the first air interface resource comprises:
preempting, for the second service, in the frequency domain, and in response to the TTI being a non-fixed value, the resource elements of the first air interface resource already allocated to the first service.

8. The method according to claim 1, further comprising reserving, before the allocating the first air interface resource to the first service, a third air interface resource for the second service on the subcarriers of all the frequency bands within the TTI; and
wherein the allocating the first air interface resource to the first service comprises allowing at least a portion of the reserved third air interface resource to be allocated to the second service; and
wherein the allocating the second air interface resource to the second service comprises preempting, for the second service, in the reserved third air interface resource, the resource elements of the first air interface resource already allocated to the first service.

9. The method according to claim 1, wherein the allocating the second air interface resource to the second service comprises:
allocating the idle resource elements in the second air interface resource in priority.

10. The method according to claim 1, the method further comprising performing, after the allocating the second air interface resource to the second service:
determining whether resource elements of the subcarriers of all the frequency bands within the current TTI time are first allocated to the first service and then allocated to the second service; and
sending information to the second service in response to the resource elements of the subcarriers of all the frequency bands within the current TTI time being first allocated to the first service and then allocated to the second service, and stopping sending information to the first service.

11. A network device, comprising:
a transmitter;
a processor; and
a non-transitory computer-readable storage medium storing a program to be executed by the processor, the program including instructions to:
allocate a first air interface resource to a first service with a first latency sensitivity;
allocate, to a second service with a second latency sensitivity that is greater than the first latency sensitivity, a second air interface resource on subcarriers of all frequency bands within a current transmission time interval (TTI);
preempt, for the second service and in response to a quantity of idle resource elements of the second air interface resource allocated to the second service not meeting a quantity of resource elements required by the second service, resource elements of the first air interface resource allocated to the first service, wherein the second service has a higher priority for obtaining the first air interface resource than the first service; and
cause the transmitter to send, based on the allocated first air interface resource, at least one of data or control information to at least one of a terminal corresponding to the second service or a terminal corresponding to the first service.

12. The network device according to claim 11, wherein the instructions to preempt, for the second service, the resource elements of the first air interface resource comprise instructions to:
preempt, for the second service, in a time domain, the resource elements of the first air interface resource already allocated to the first service.

13. The network device according to claim 12, wherein that the instructions to preempt, for the second service, in the time domain, the resource elements of the first air interface resource comprise instructions to:
preempt, for the second service, on a plurality of subcarriers of at least some frequency bands within the entire TTI, first resource elements already allocated to the first service.

14. The network device according to claim 11, wherein the instructions to preempt, for the second service, the resource elements of the first air interface resource comprise instructions to:
preempt, for the second service, in a frequency domain, the resource elements of the first air interface resource already allocated to the first service.

15. The network device according to claim 14, wherein instructions to preempt, for the second service, in the frequency domain, the resource elements of the first air interface comprise instructions to:
preempt, for the second service and on subcarriers of all frequency bands within a time of a plurality of orthogonal frequency division multiplexing (OFDM) symbols of at least a part of the TTI, the resource elements already allocated to the first service.

16. The network device according to claim 11, wherein the program further includes instructions to perform, before allocating the first air interface resource to the first service:
reserve a third air interface resource for the second service on the subcarriers of all the frequency bands within the TTI;
allow a part or all of the reserved third air interface resource to be allocated to the first service when allocating the first air interface resource to the first service; and
preempt, when allocating the second air interface resource to the second service, for the second service, in the reserved third air interface resource, the resource elements of the first air interface resource already allocated to the first service.

17. The network device according to claim 11, wherein program further includes instructions to:
allocate the idle resource elements in the second air interface resource in priority when allocating the second air interface resource to the second service.

18. A network device, comprising:
a transmitter;
a processor; and
a non-transitory computer-readable storage medium storing a program to be executed by the processor, the program including instructions to:
- allocate, to a second service with a second latency sensitivity, a second air interface resource on subcarriers of all frequency bands within a current transmission time interval (TTI);
- preempt, for the second service and in response to a quantity of idle resource elements of the second air interface resource allocated to the second service not meeting a quantity of resource elements required by the second service, resource elements of a first air interface resource allocated to a first service with a first latency sensitivity that is less than the second latency sensitivity and with a lower priority for obtaining the first air interface resource than a priority of the second service; and
- cause the transmitter to send, using allocated first air interface resource, at least one of data or control information to a terminal corresponding to the second service.

19. The network device according to claim 18, wherein the program further includes instructions to:
- reserve a third air interface resource for the second service on the subcarriers of all the frequency bands within the TTI;
- allocate a part or all of the reserved third air interface resource to the first service as part of the first air interface resource; and
- preempt, when allocating the second air interface resource to the second service, for the second service, resource elements of the reserved third air interface resource.

20. The network device according to claim 18, wherein program further includes instructions to:
- allocate the idle resource elements in the second air interface resource in priority when allocating the second air interface resource to the second service.

\* \* \* \* \*